(12) United States Patent
Claus et al.

(10) Patent No.: US 6,735,007 B2
(45) Date of Patent: May 11, 2004

(54) OPTOELECTRONIC DEVICE

(75) Inventors: Armin Claus, Nürtingen (DE); Thomas Dümmel, Hülben (DE)

(73) Assignee: Leuze Electronic GmbH & Co., Oven/Teck (DE)

( * ) Notice: Subject to any disclaimer, the term of this patent is extended or adjusted under 35 U.S.C. 154(b) by 0 days.

(21) Appl. No.: 10/360,933

(22) Filed: Feb. 10, 2003

(65) Prior Publication Data

US 2003/0151788 A1 Aug. 14, 2003

(30) Foreign Application Priority Data

Feb. 8, 2002 (DE) .......................... 102 05 294

(51) Int. Cl.⁷ .............................. G02B 26/08
(52) U.S. Cl. .................. 359/212; 359/216; 235/462.36; 235/462.39
(58) Field of Search ................. 359/196–226; 235/462.01, 462.11, 462.16, 462.17, 462.22–462.29, 462.36–462.41; 250/234–236

(56) References Cited

FOREIGN PATENT DOCUMENTS

| DE | 198 44 238 A1 | 4/2000 |
| WO | WO 00/16239 A1 | 3/2000 |

*Primary Examiner*—James Phan
(74) *Attorney, Agent, or Firm*—Venable LLP; Robert Kinberg

(57) ABSTRACT

An optoelectronic device detects labels provided with contrasting patterns. A transmitter emits light rays, and a receiver receives the light rays. The receiver includes a receiver output for outputting receiver signals. A reflecting unit periodically guides the light rays within a monitoring range. An evaluation unit for evaluating the receiver signals from the receiver, The transmitter, receiver, and reflecting unit are arranged such that the light rays are guided from said transmitter to said reflecting unit to the label to said reflecting unit to said receiver. The receiver includes at least one light sensitive surface that at least partially encloses the light rays transmitted from said transmitter to said reflecting unit.

22 Claims, 3 Drawing Sheets

OPTOELECTRONIC DEVICE

CROSS-REFERENCE TO RELATED APPLICATION

This application claims the priority of German Patent Application No. 102 05 294.8 filed Feb. 8, 2002. The disclosure of the foregoing priority application and of each and every U.S. and foreign patent and patent application mentioned herein are incorporated herein by reference.

BACKGROUND OF THE INVENTION

The invention relates to an optoelectronic device for detecting labels having contrasting patterns.

An optoelectronic device is known from German Patent Document DE 198 44 238 A1. The conventional optoelectronic device is used to detect labels, in particular, barcode labels. The optoelectronic device includes a transmitter with a transmitting optic connected downstream of the transmitter, and a receiver with a receiving optic connected in front of the receiver. The light rays emitted by the transmitter and the receiving light rays reflected by the labels are guided over a reflecting unit. The reflecting unit consists of a rotating polygonal mirror wheel with a plurality of mirror surfaces. The reflecting unit periodically guides the light rays emitted by the transmitter over a monitoring range.

Reflecting mirrors, across which the light rays from the transmitted and light rays to the receiver are guided, are arranged between the transmitter and the reflecting unit, as well as between the receiver and the reflecting unit. The reflecting mirrors guide the light rays from the transmitter and the light rays to the receiver over the same mirror surface of the polygonal mirror wheel.

The conventional optoelectronic device includes a plurality of optical components over which the light rays from the transmitter and to the receiver must be guided.

The individual components, in particular the reflecting mirrors, require an exact calibration. This calibration results in an undesirably high assembly expenditure during the manufacture of the optoelectronic device. In addition, the optoelectronic device has an undesirably large structural shape, particularly since the arrangement of the reflecting mirrors and the receiving optic in front of the receiver require a large amount of space.

Another optoelectronic device for detecting barcode labels is known from International publication WO 00/16239. With this optoelectronic device, the transmitter and the receiver are arranged at a distance to each other, one above the other. The light rays emitted by the transmitter and the light rays reflected by the labels are guided over a reflecting unit. The reflecting unit is a polygonal mirror wheel with a plurality of mirror surfaces. The light rays emitted by the transmitter and reflected by the barcodes are respectively guided over the same mirror surface of the polygonal mirror wheel. The light rays from the transmitter and the light rays from the barcodes are guided so as to be spatially separated. Thus, the light rays emitted by the transmitter impinge on the upper partial section of the respective mirror surface on the polygonal mirror wheel while the light rays reflected by the barcodes are guided across the lower partial section a particular mirror surface.

To achieve a complete spatial separation of the light rays from the transmitter and the light rays from the barcodes, the partial sections of the mirror surface must be clearly offset relative to each other.

This conventional optoelectronic device is relatively miniaturized to some degree because the receiver is installed at a distance opposite the reflecting unit, without a receiving optic in front of the receiver. However, as compared to traditional polygonal mirror wheels, the height of the polygonal mirror wheel in the above-described optoelectronic device must be noticeably increased to obtain the desired separation of the light rays. In turn, this requires an undesirable enlargement of the structural shape of the optoelectronic device. A further disadvantage is that the optical axes of the transmitter and the receiver must be aligned precisely, relative to each other and relative to the position of the reflecting unit, to ensure the desired spatial separation of the light rays from the transmitter and the light rays from the barcodes.

SUMMARY OF THE INVENTION

It is an object of the invention to design an optoelectronic device for detecting barcodes having the smallest possible structural shape.

The above and other objects are achieved according to an embodiment of an optoelectronic device of the present invention which is set forth herein by way of example only. Exemplary modifications of the invention are additionally described herein.

The optoelectronic device of the present invention detects labels with contrasting patterns. According to an exemplary embodiment, transmitter emits transmitting light rays, and a receiver receives receiving light rays. A reflecting unit is used to guide the light rays from the transmitter periodically inside a monitoring range, and an evaluation unit evaluates the signals output from the receiver. The light rays reflected by the labels are guided via the reflecting unit onto the receiver. The receiver has a light-sensitive surface which at least partially encircles the light rays emitted from the transmitter.

One advantage of the present invention is that the transmitter and the receiver of the optoelectronic device are positioned opposite the reflecting unit, without reflecting mirrors installed in between. According to an exemplary embodiment, as a result of the large-surface, light-sensitive surface that encloses the path of the light rays transmitted by the transmitter, the light rays from the barcodes are guided by the reflecting unit nearly completely onto the receiver, without the aid of a receiving optic. Thus, the optoelectronic device according to the invention has only a small number of optical components and can be produced cheaply with little assembly expenditure. An extremely small structural shape is achieved as a result of directly coordinating the transmitter and the receiver, without the installation of a receiving optic and without the use of reflecting mirrors.

This advantage is further increased in that the light-sensitive surface of the receiver at least partially encloses the light rays emitted by the transmitter, thus resulting in a coaxial guidance of the light rays from the transmitter and the light rays guided to the receiver.

The reflecting unit optionally includes a polygonal mirror wheel with a predetermined number of mirror surfaces. The light rays from the transmitter and the light rays from the barcodes are respectively guided over the same mirror surface of the polygonal mirror wheel.

As a result of the coaxial guidance of the two types light rays, the transmitting light spot projected onto the respective mirror surface is at least partially surrounded by the receiving light spot projected onto the same mirror surface. This results in an efficient use of the mirror surface of the polygonal mirror wheel because it is illuminated almost totally by the two types of light rays. In turn, the dimensions of the mirror surfaces can be adapted optimally to the cross section of the transmitting light spot and the receiving light spot. As a result, the mirror surfaces and thus the complete polygonal mirror wheel have a smaller structural size.

According to an exemplary embodiment, the receiver is arranged on a carrier installed directly downstream of the transmitter. The light-sensitive surface of the receiver and the carrier, however, are each provided with corresponding recesses, and the light rays from the transmitter are guided through the recesses. This type of arrangement for the transmitter and the receiver requires only a small structural volume and the assembly is quick and cost-effective. Moreover, the calibration expenditure is particularly low.

For optical separation of the light rays from the transmitter and the light rays to the receiver and to avoid light rays intended for the receiver from entering the transmitter, the recesses in the carrier and the receiver are fitted with a sleeve, the front end of which optionally projects over the receiver front. The light rays from the transmitter are guided inside this sleeve and have a smaller ray diameter than the inside diameter of the sleeve.

According to one embodiment, the receiver has a one-piece, coherent, light-sensitive surface. It is advantageous if the light-sensitive surface forms a homogeneous, continuous surface that has a high sensitivity for detecting the impinging light rays.

The receiver of another embodiment comprises a number of receiving elements with light-sensitive partial surfaces, which jointly form the light-sensitive surface. Conventional and cost-effective PIN diode elements can be used as receiving elements.

BRIEF DESCRIPTION OF THE DRAWINGS

The invention is explained in the following with the aid of the drawings which showing an exemplary embodiment and without restricting the general inventive idea.

DETAILED DESCRIPTION OF THE INVENTION

Figure 1:
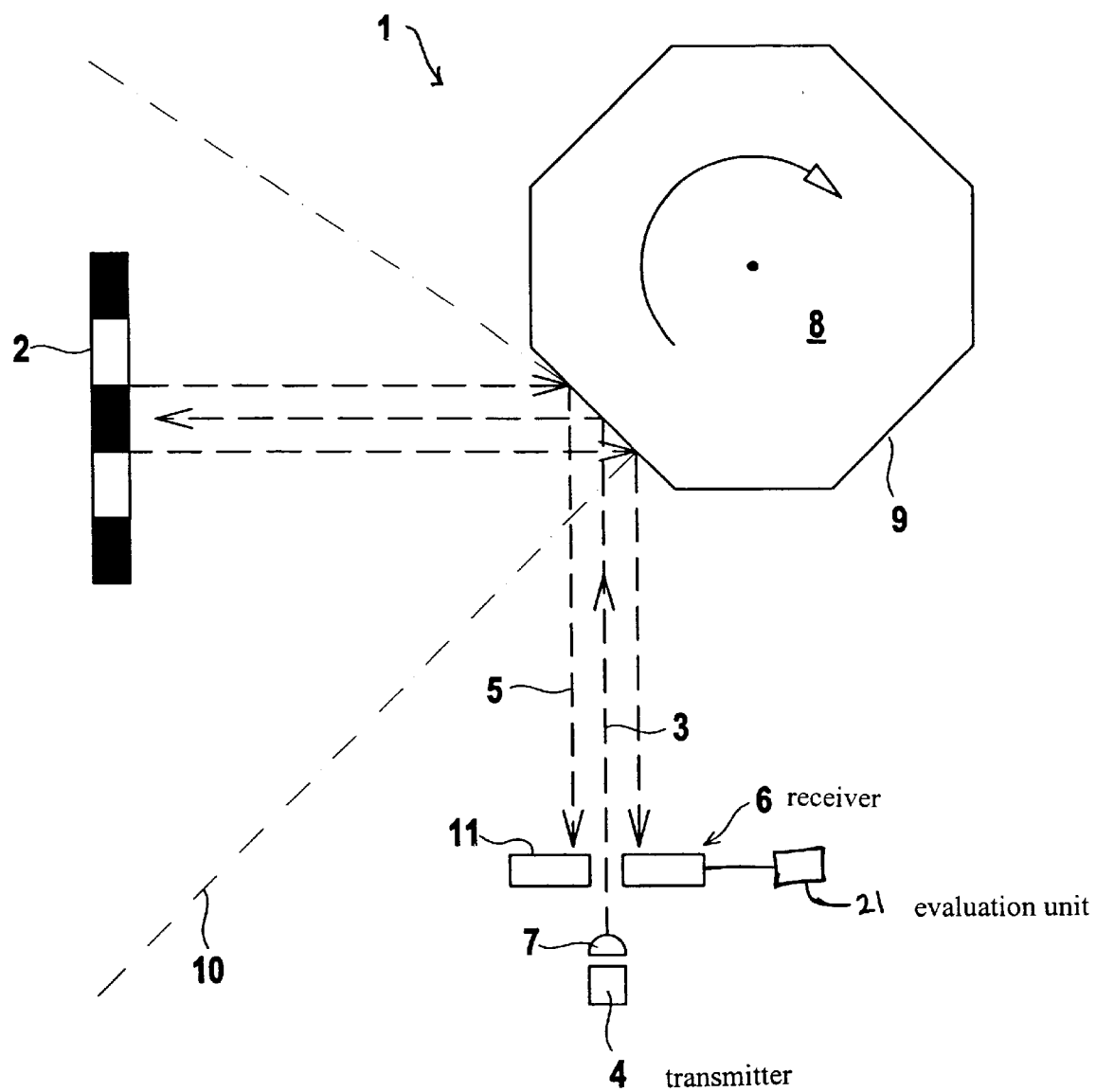
FIG. 1 illustrates a schematic representation of an exemplary embodiment of the optoelectronic device according to the present invention.

Identical or corresponding parts are given the same reference numerals in the drawings and may not be introduced again.

FIG. 1 schematically shows the configuration of an optoelectronic device 1 for detecting labels having defined contrast patterns. The labels can have optional sequences and shapes of adjoining light and dark surfaces, optionally black and white surfaces. In the following description, the labels are barcodes 2. The barcodes 2 typically include a sequence of black and white bar elements with a defined length and width. The optoelectronic device 1 comprises a transmitter 4 for emitting transmitting light rays 3 and a receiver 6 for receiving the receiving light rays 5. The transmitter 4, which is optionally a laser diode, is optionally installed in series upstream from a transmitting optic 7 that focuses the light rays 3.

The light rays 3 emitted by the transmitter 4 and the light rays 5 reflected back by the barcode 2 are each guided over a reflecting unit. The reflecting unit includes of a motor driven polygonal mirror wheel 8 with a plurality of facet-cut mirror surfaces 9.

As a result of a rotational movement of the polygonal mirror wheel 8, the light rays 3 emitted by the transmitter 4 are periodically guided over a monitoring range 10 located in a scanning plane. The monitoring range 10 extends over a specific angular region that is predetermined by the number of mirror surfaces 9 of the polygonal mirror wheel 8.

Signals output from the receiver 6 are amplified in an amplifier (not shown) and evaluated in an evaluation unit 21.

The light rays 5 reflected from the barcodes 2, experience an amplitude modulation that corresponds to the sequence of black and white bar elements in the barcode 2. The signals output from receiver 6 have a corresponding amplitude modulation. The analogue, amplitude-modulated signals are evaluated in the evaluation unit 21 with the aid of a threshold value unit. As a result, binary signal sequences are generated which are used to detect the barcode 2 through a comparison with stored contrast patterns for the barcodes 2.

The light rays 3 emitted by the transmitter 4 are guided onto the reflecting unit, and the light rays 5 that are reflected by the labels back to the receiver 6, via the reflecting unit, take a coaxial path.

The coaxial guidance is achieved in that the light-sensitive surface 11 of receiver 6, which is installed downstream from the transmitter 4 and the transmitting optic 7, at least partially surrounds the light rays 3.

The transmitter 4 and the receiver 6 are positioned at a distance to the polygonal mirror wheel 8 such that the light rays 3 and the light rays 5 are guided across the same mirror surface 9 of the polygonal mirror wheel 8. The mirror surfaces 9 of the polygonal mirror wheel 8 are oriented perpendicular to the axes of the light rays 3 and the light rays 5 in one exemplary embodiment. The receiving light point projected onto the mirror surface 9 at least partially encloses the transmitting light point of the light rays 3 projected onto the same mirror surface 9. The mirror surfaces 9 are adapted to the geometric dimensions of the light rays 3 and the light rays 5, such that the light rays 3, 5 illuminate the mirror surface 9 as completely as possible.

Figure 2:
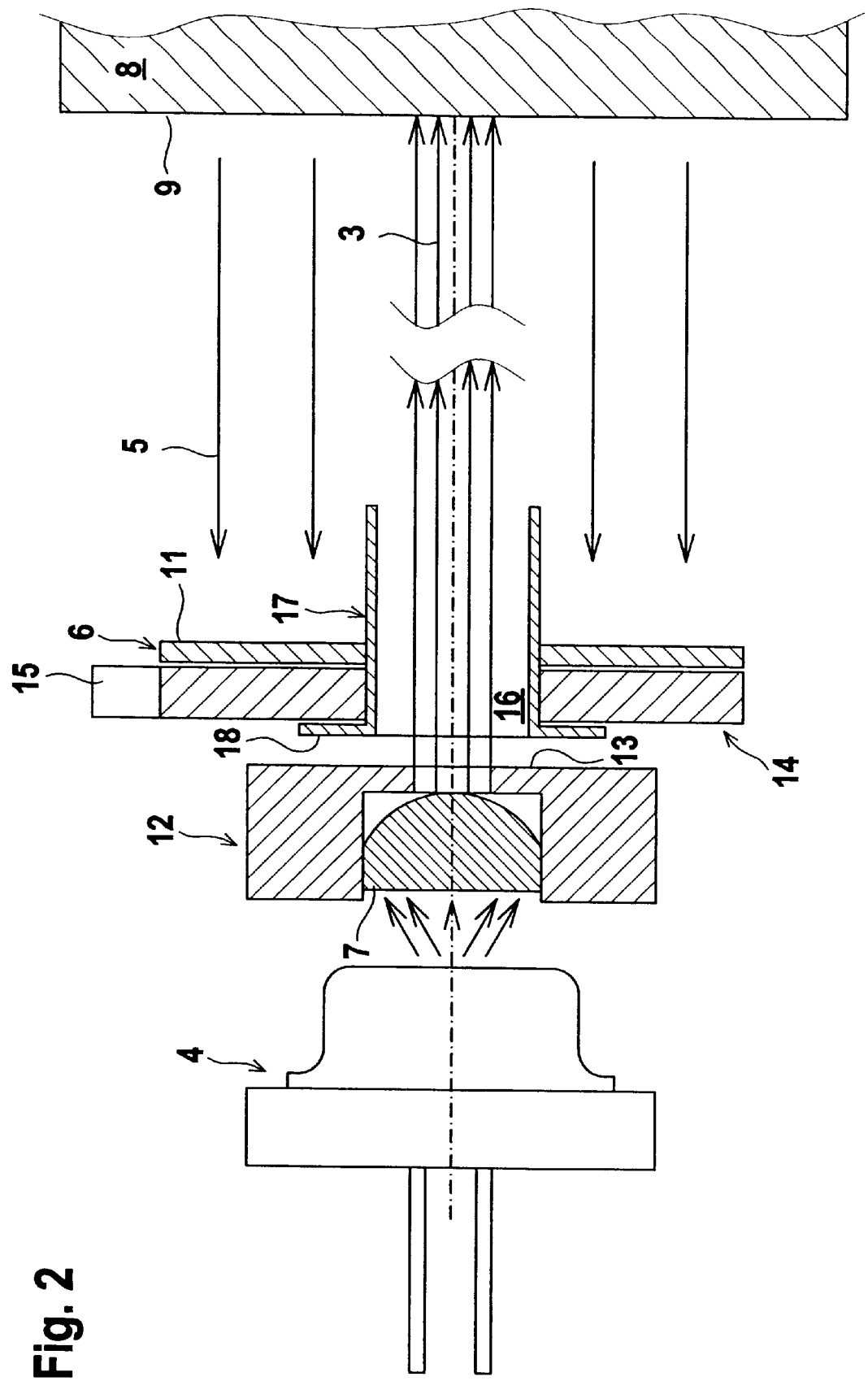
FIG. 2 illustrates a detailed representation of a segment of the optoelectronic device shown in FIG. 1.

FIG. 2 shows a detailed view of the optical components of the optoelectronic device 1 according to FIG. 1.

A laser diode functioning as the transmitter 4 is secured in a holder (not shown in FIG. 2). A lens holder 12 is downstream of the transmitter 4 and holds a lens functioning as transmitting optic 7. The lens holder 12 includes a plastic molded part or the like and is provided with a diaphragm 13 on the front. The diaphragm 13 limits the beam diameter of the light rays 3 that are focused with the transmitting optic 7. The transmitter 4, the lens holder 12 and the transmitting optic 7 together form a transmitter module.

A receiver module can be installed directly behind the transmitter module. The receiver module comprises a carrier 14 and the receiver 6 which is fit onto the carrier 14.

The carrier 14 is provided with connectors 15 in the form of pins, which project from one edge of the carrier 14. The pins are used to attach and solder the carrier 14 to a board (not shown) on which the evaluation unit is integrated.

The carrier 14 and the receiver 6 respectively and contain a single recess 16 in an exemplary embodiment. For the exemplary embodiment shown in FIG. 2, the recesses 16 are formed as congruent, coaxial bores.

A light-impermeable sleeve 17 is inserted into the bores 16 and forms a component of the receiver module. The sleeve 17 comprises a light-impermeable plastic molded part. In one exemplary embodiment, the sleeve 17 has a hollow-cylindrical shape with a ring-shaped shoulder 18 on the back end projecting from the outer shell surface. The sleeve 17 extends through the bores in the carrier 14 and the receiver 6 and projects with its front edge slightly over the front of the receiver 6 with the light-sensitive surface 11.

The sleeve 17 is inserted from the back of the carrier 14 into the bores of the carrier 14 and the receiver 6 until the shoulder 18 fits against the back wall of the carrier 14 to stabilize the position of sleeve 17.

The longitudinal axis of sleeve 17 extends coaxial to the optical axes of the transmitter 4 and the transmitting optic 7. The beam diameter of the light rays 3 are smaller than the inside diameter of the sleeve 17 such that the light rays 3 pass through the sleeve 17.

The sleeve 17 functions to optically decouple the light rays 3 and the light rays 5.

The light-sensitive surface 11 of the receiver 6 is positioned opposite the reflecting unit without a receiving optic installed in between. The light-sensitive surface 11 of the receiver 6, as well as the mirror surfaces 9 of the polygonal mirror wheel 8, are oriented in a vertical plane that extends perpendicular to the axes of the light rays 3 and the light rays 5.

The largest possible surface is selected for the light-sensitive surface 11 of receiver 6 in order to increase the detection sensitivity, and the surface is optionally adapted to the dimensions of the mirror surfaces 9. For the embodiment shown in FIG. 2, the light-sensitive surface 11 completely encloses the bore in the receiver 6, and the area of the bore is considerably smaller than the light sensitive surface 11. As a result, a high detection sensitivity of the receiver 6 is obtained. As shown in FIG. 2, the light rays 5 that extend coaxial to the light rays 3 nearly completely illuminate the light-sensitive surface 11.

FIGS. 3–7 show different designs for the receiver 6 of the optoelectronic device 1.

Figure 3:
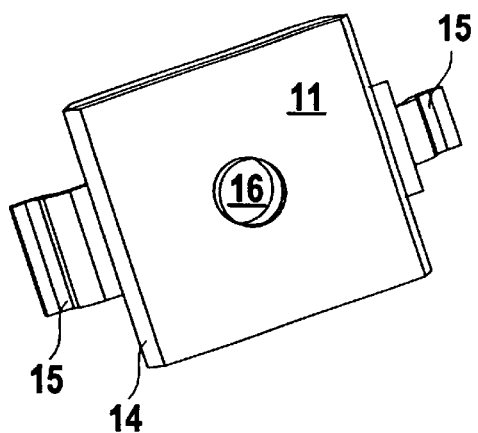
FIGS. 3–7 illustrate various embodiments of the receiver for the optoelectronic device according to the present invention.

FIG. 3 shows the receiver 6 positioned on a square carrier 14 with two connectors 15 projecting from the side for securing the carrier 14 to a board. The receiver 6 is adapted to the size of the carrier 14 so that the receiver's light-sensitive surface 11 extends over the complete surface of the carrier 14. The homogeneous, light-sensitive surface 11 has a one-piece design and a square outside contour. As in the carrier 14, the receiver 6 is provided with a circular, central bore that forms the recess 16 through which the light rays 3 emitted from the transmitter are guided. Since the light-sensitive surface 11 extends continuously over the complete carrier surface, a large portion of the light rays 5 is guided from the reflecting unit onto the receiver 6, thus resulting in a high detection sensitivity of the receiver 6. The receiver 6 primarily includes a large-surface PIN diode element.

Figure 4:
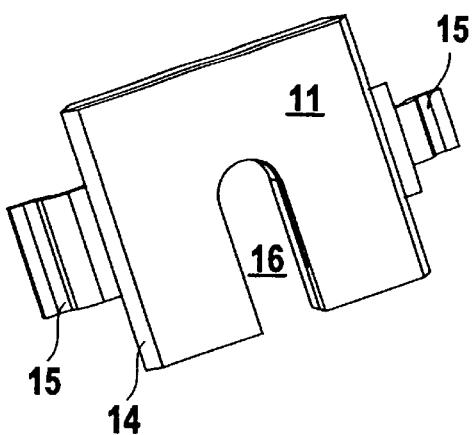

FIG. 4 shows a modification of the embodiment shown in FIG. 3. The receiver 6 again has a one-piece, homogeneous, light-sensitive surface 11 that extends over the complete area of the square carrier 14. In contrast to the exemplary embodiment of FIG. 3, the recesses 16 in the carrier 14 and the receiver 6 do not take the form of circular bores. Rather, the recesses 16 in FIG. 4 extend from the center of the carrier 14 and/or the receiver 6 to the edges. Thus, the light-sensitive surface 11 no longer completely encloses the light rays 3 guided through recesses 16, but instead, the light-sensitive surface only partly encloses the light rays 3 emitted by the transmitter.

Figure 5:
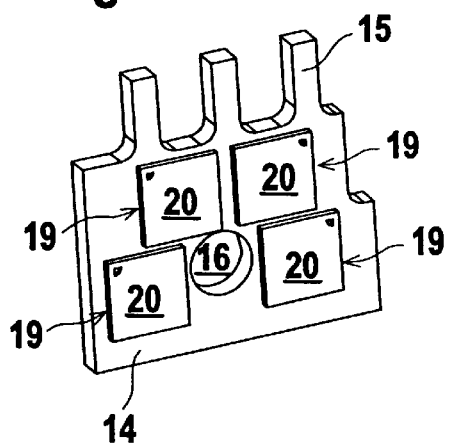
Figure 6:
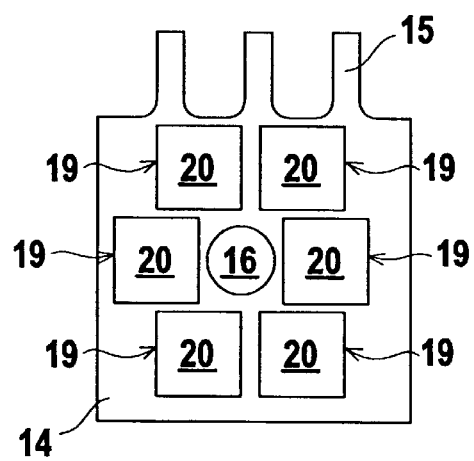
Figure 7:
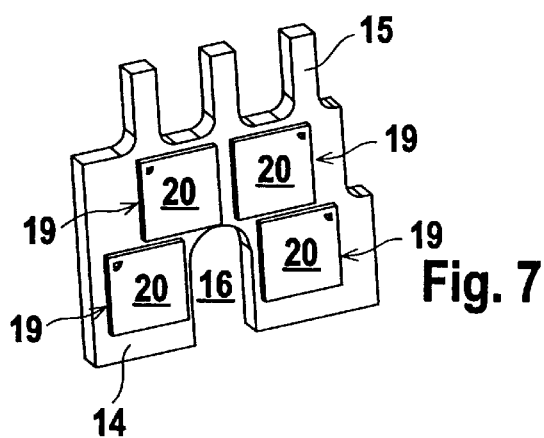

FIGS. 5–7 show designs for a receiver 6 which comprises multiple parts. The receiver 6 includes a plurality of separate receiving elements 19 that optionally have identical designs and are formed by traditional PIN diode elements. The individual receiving elements 19 have light-sensitive partial surfaces 20 that complement each other and form a single joint light-sensitive surface 11. For this, the sum of all output signals from the individual receiving elements 19 is determined in the evaluation unit and used to generate the receiving signal for the receiver 6. The detection sensitivity necessary for receiving the light rays 5 is obtained by connecting the individual receiving elements 19 of the receiver 6.

FIGS. 5–7 show that the carrier 14 respectively has an essentially square cross section formed by a circuit board. Respectively three parallel-extending pins project from the upper edges of the carrier 14 to form the connectors 15 for connecting the carrier to the board.

FIG. 5 shows a receiver 6 provided with four identically designed receiving elements 19 that have square, light-sensitive partial surfaces 20. The centrally positioned circular bore of carrier 14 forms the recess 16 through which the light rays 3 are guided. The receiving elements 19 are arranged in a U shape around the bore so that the light-sensitive partial surfaces 20 in part enclose the light rays 3 which pass through the bore.

FIG. 6 shows a first modification of the exemplary embodiment shown in FIG. 5. As in FIG. 5, the carrier 14 has a central circular bore through which the transmitting light rays 3 pass. In contrast to the embodiment shown in FIG. 5, the receiver 6 in this case is provided with six identical receiving elements 19.

The receiving elements 19 adjoin the edge of the bore and are arranged essentially rotation-symmetrical to the bore such that the light-sensitive partial surfaces 20 form a ring-shaped arrangement and completely enclose the light rays 3 that are guided through the bore.

FIG. 7 shows a second modification of the exemplary embodiment according to FIG. 5. The square carrier 14 is provided with a recess 16 that extends from the center of carrier 14 to its lower edge. The light rays 3 pass through the recess 16 in the central region of the carrier 14. The receiver 6 is provided with four receiving elements 19 with identical design and square, light-sensitive partial surfaces 20. The receiving elements 19 adjoin the edge of the recess 16, thereby forming a U-shaped arrangement.

The embodiments of FIGS. 5–7 show that the number of receiving elements 19 and their arrangement on the carrier 14 are selected such that their light-sensitive partial surfaces 20 cover the highest possible share of the carrier 14 surface to obtain a correspondingly high detection sensitivity for the receiver 6.

The invention has been described in detail with respect to exemplary embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

What is claimed is:

1. An optoelectronic device for detecting labels having with contrasting patterns, comprising:
   a transmitter for emitting light rays;
   a receiver for receiving the light rays, said receiver including a receiver output for outputting receiver signals;

a reflecting unit that periodically guides the light rays within a monitoring range; and an evaluation unit for evaluating the receiver signals from the receiver, wherein said transmitter, said receiver, and said reflecting unit are arranged such that the light rays are guided from said transmitter to said reflecting unit to the label to said reflecting unit and to said receiver, and wherein the receiver includes at least one light sensitive surface that at least partially surrounds the light rays emitted from said transmitter.

2. The optoelectronic device according to claim 1, wherein said transmitter has a front side, said receiver adjoins the front side of said transmitter, said receiver defines a recess, and the light rays emitted from said transmitter are guided through said recess.

3. The optoelectronic device according to claim 2, wherein the light-sensitive surface of said receiver forms a rotation-symmetrical arrangement around said recess.

4. The optoelectronic device according to claim 2, wherein the recess is a central bore in the light-sensitive surface of said receiver.

5. The optoelectronic device according to claim 2, wherein said receiver includes at least one edge, the recess terminating at the at least one edge of said receiver.

6. The optoelectronic device according to claim 5, wherein the light-sensitive surface of said receiver is U-shaped in an area adjacent to the recess.

7. The optoelectronic device according to claim 1, wherein the light sensitive surface forms the entire surface of receiver.

8. The optoelectronic device according to claim 1, wherein said receiver comprises a plurality of receiving elements having light-sensitive partial surfaces forming the light-sensitive surface.

9. The optoelectronic device according to claim 8, wherein the receiving elements delimit the recess of said receiver.

10. The optoelectronic device according to claim 8, wherein each the receiving elements output a receiving element signal and the signal outputted by the receiver is formed by summing the receiving element signals of the receiving elements.

11. The optoelectronic device according to claim 7, wherein the receiving elements are PIN diode elements.

12. The optoelectronic device according to claim 7, further comprising a carrier having a recess, wherein said receiver is arranged on said carrier such that the carrier recess corresponds to the receiver recess.

13. The optoelectronic device according to claim 12, further comprising a board, wherein said evaluation unit is integrated onto said board and said carrier includes connectors for connecting said carrier to said board.

14. The optoelectronic device according to claim 13, wherein the carrier includes at least one edge, and the connectors are pins projecting from the at least one edge of the carrier.

15. The optoelectronic device according to claim 12, further comprising a light-impermeable sleeve fitted into the recess of the carrier and recess of the receiver, said receiver, said carrier, said transmitter, and said reflecting unit being arranged such that the light rays are guided through said sleeve.

16. The optoelectronic device according to claim 15, wherein said sleeve has an inside with a diameter, and the light rays emitted by the transmitter have a beam smaller than the inside diameter of said sleeve.

17. The optoelectronic device according to claim 15, wherein said receiver has a back and a front, said front is formed by the light sensitive surface, and the sleeve projects over the front of said receiver.

18. The optoelectronic device according to claim 15, wherein said carrier, said receiver and said sleeve form a single receiver module.

19. The optoelectronic device according to claim 18, further comprising an optic for focusing the light rays emitted by said transmitter, said optic being arranged downstream of said transmitter.

20. The optoelectronic device according to claim 19, further comprising a lens holder for positioning said optic.

21. The optoelectronic device according to claim 20, wherein said transmitter, said optic, and said lens holder form a single transmitting module arranged upstream of the receiver module.

22. The optoelectronic device according to claim 1, wherein said reflecting unit includes a polygonal mirror wheel with a plurality of mirror surfaces, wherein a light spot projected by the light rays from the labels onto a particular mirror surface at least partially surrounds a light spot projected by the light rays from the transmitter onto the particular mirror surface.

* * * * *